United States Patent [19]
Hiyama et al.

[11] Patent Number: 5,838,447
[45] Date of Patent: Nov. 17, 1998

[54] POLISHING APPARATUS INCLUDING THICKNESS OR FLATNESS DETECTOR

[75] Inventors: Hirokuni Hiyama, Tokyo; Yutaka Wada, Yokohama, both of Japan

[73] Assignee: Ebara Corporation, Tokyo, Japan

[21] Appl. No.: 683,959

[22] Filed: Jul. 19, 1996

[30] Foreign Application Priority Data

Jul. 20, 1995 [JP] Japan ................................. 7-206593

[51] Int. Cl.⁶ .......................... G01B 11/06; G01B 11/30; G01N 21/84
[52] U.S. Cl. .......................... 356/381; 356/426; 356/371; 451/6
[58] Field of Search .................... 356/381, 382, 356/371, 426; 250/559.29; 451/63, 6

[56] References Cited

U.S. PATENT DOCUMENTS

| | | | |
|---|---|---|---|
| 3,671,726 | 6/1972 | Kerr | 356/381 |
| 3,737,237 | 6/1973 | Zurasky | 356/382 |
| 5,081,796 | 1/1992 | Schultz | 451/63 |
| 5,351,126 | 9/1994 | Takada et al. | 356/381 |
| 5,433,651 | 7/1995 | Lustig et al. | |
| 5,562,529 | 10/1996 | Kishii et al. | 451/63 |

Primary Examiner—Frank G. Font
Assistant Examiner—Amanda Merlino
Attorney, Agent, or Firm—Wenderoth, Lind & Ponack, L.L.P.

[57] ABSTRACT

A polishing apparatus polishes a workpiece such as a semiconductor wafer while detecting a thickness or a flatness of a surface layer of the workpiece on a real-time basis. The polishing apparatus includes a turntable with a polishing cloth mounted on an upper surface thereof, and a top ring disposed above the turntable for supporting a workpiece to be polished and such workpiece against the polishing cloth. The polishing apparatus also has a thickness detector for detecting the thickness of a surface layer of the workpiece supported by the top ring while the workpiece is being polished without exposing the workpiece. The thickness detector includes a sensor mounted in the turntable and including at least one light-emitting element for emitting light toward the surface layer of the workpiece and at least one light-detecting element for detecting light reflected from the surface layer of the workpiece.

39 Claims, 4 Drawing Sheets

POLISHING APPARATUS INCLUDING THICKNESS OR FLATNESS DETECTOR

BACKGROUND OF THE INVENTION

1. Field of the Invention

The present invention relates to a polishing apparatus, and more particularly to a polishing apparatus for polishing a workpiece such as a semiconductor wafer mounted on a top ring while detecting a thickness or a flatness of a surface layer of the workpiece on a real-time basis without exposing a polished surface of the workpiece.

2. Description of the Related Art

Recent rapid progress in semiconductor device integration demands smaller and smaller wiring patterns or interconnections and also narrower spaces between interconnections which connect active areas. One of the processes available for forming such interconnection is photolithograpy. Though the photolithographic process can form interconnections that are at most 0.5 $\mu$m wide, it requires that surfaces on which pattern images are to be focused by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus.

Conventionally, a polishing apparatus has a turntable and a top ring which rotate at respective individual speeds. A polishing cloth is attached to the upper surface of the turntable. A semiconductor wafer to be polished is placed on the polishing cloth and clamped between the top ring and the turntable. An abrasive liquid containing abrasive grains is supplied onto the polishing cloth and retained on the polishing cloth. During operation, the top ring exerts a certain pressure on the turntable, and the surface of the semiconductor wafer held against the polishing cloth is therefore polished to a flat mirror finish while the top ring and the turntable are rotating.

In a process of polishing a semiconductor wafer with the above polishing apparatus, there are instances where it is necessary to determine whether the surface layer of the semiconductor wafer which is being polished reaches a desired flatness or thickness.

Specifically, after a deposited layer is formed on the semiconductor wafer and various integrated circuits are formed on the deposited layer, it is often practiced to remove an oxide layer on the integrated circuits or polish the oxide layer to produce a flat surface. At this time, it is desirable that the oxide layer be removed flatwise up to upper surfaces of the integrated circuits without removal of any portions of the integrated circuits.

The above flattening process has heretofore been carried out by controlling the rotational speeds of the turntable and the top ring, the pressure applied to the turntable by the top ring, the composition of a chemical slurry, and the time when the polishing process is effected. It has been customary to confirm a thickness and flatness of a surface layer of the semiconductor wafer by physically measuring the thickness and flatness according to known processes in the art after removing the semiconductor wafer from the polishing apparatus.

If the polished semiconductor wafer does not meet desired specifications, then the semiconductor wafer is set again in the polishing apparatus, and then polished in a second polishing process by the polishing apparatus. For detecting the thickness and flatness of a surface layer of the semiconductor wafer, it is necessary to remove the semiconductor wafer from the polishing apparatus, and if the semiconductor wafer is not sufficiently polished, then it is necessary to set the semiconductor wafer again in the polishing apparatus. The above processes are repeated until a desired thickness or flatness of the surface layer is obtained. The above conventional method results in a large expenditure of time and labor.

There has been proposed a process of detecting a thickness of a surface layer of the semiconductor wafer by displacing the top ring with the semiconductor mounted thereon to a position off the turntable, thus exposing the polished surface of the semiconductor wafer. The proposed process is effective to reduce the expenditure of time and labor. However, since the top ring needs to be temporarily positioned off the turntable for the detection of the thickness of the surface layer of the semiconductor wafer, the thickness of the surface layer cannot be detected on a real-time basis while the semiconductor wafer is being polished. Another problem is that the time required to polish the semiconductor wafer is relatively long because displacement of the semiconductor has to be effected.

SUMMARY OF THE INVENTION

It is therefore an object of the present invention to provide a polishing apparatus for polishing a workpiece mounted on a top ring while detecting a thickness or flatness of a surface layer of the workpiece on a real-time basis without removing the workpiece from the top ring or positioning the top ring off a turntable.

To achieve the above object, according to the present invention, there is provided a polishing apparatus comprising:

a turntable with a polishing cloth mounted on an upper surface thereof;

a top ring disposed above the turntable for supporting a workpiece to be polished and pressing the workpiece against the polishing cloth;

and a thickness detector including a sensor mounted in the turntable at a position within a path along which the top ring moves on the turntable, and the sensor comprising at least one light-emitting element for emitting light toward a surface layer of the workpiece and at least one light-detecting element for detecting light reflected from the surface layer of the workpiece;

wherein the thickness detector detects a thickness of the surface layer of the workpiece supported by the top ring on a real-time basis while the workpiece is being polished without exposing a polished surface of the workpiece.

The thickness detector may detect the thickness of the surface layer of the workpiece based on a change in the intensity of light reflected from the surface layer of the workpiece and detected by the light-detecting element.

The sensor may comprise a plurality of radially spaced light-emitting elements and a plurality of radially spaced light-detecting elements for detecting the thickness of the surface layer of the workpiece over an entire surface thereof at one time on a real-time basis.

The polishing cloth may include a sectorial region extending radially and comprising either a polishing cloth having a low abrasion capability or a material having no abrasion capability, the sensor being positioned in the sectorial region.

The thickness detector may comprise an amplifier for amplifying a light signal detected by the light-detecting signal, an analog filter for removing noise from the light signal amplified by the amplifier, an analog-to-digital converter for converting the light signal into a digital signal, and a computing unit for calculating the absolute value of the difference between the digital signal and an initial value, and comparing the calculated absolute value of the difference with a predetermined threshold value to produce resultant data. The thickness detector may further comprise a controller for controlling operating parameters of the polishing apparatus based on the resultant data produced by the computing unit.

While the workpiece is being polished, light emitted from the light-emitting element or elements impinges on the polished surface of the workpiece, and light reflected from the polished surface of the workpiece is received by the light-detecting element or elements. The thickness of the surface layer of the workpiece can automatically continuously be detected on a real-time basis based on the light detected by the light-detecting element or elements. Consequently, it is not necessary to remove the workpiece from the top ring or displace the top ring off the turntable for the purpose of detecting the thickness of the surface layer of the workpiece.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A polishing apparatus according to an embodiment of the present invention will be described below with reference to the drawings.

Figure 1:
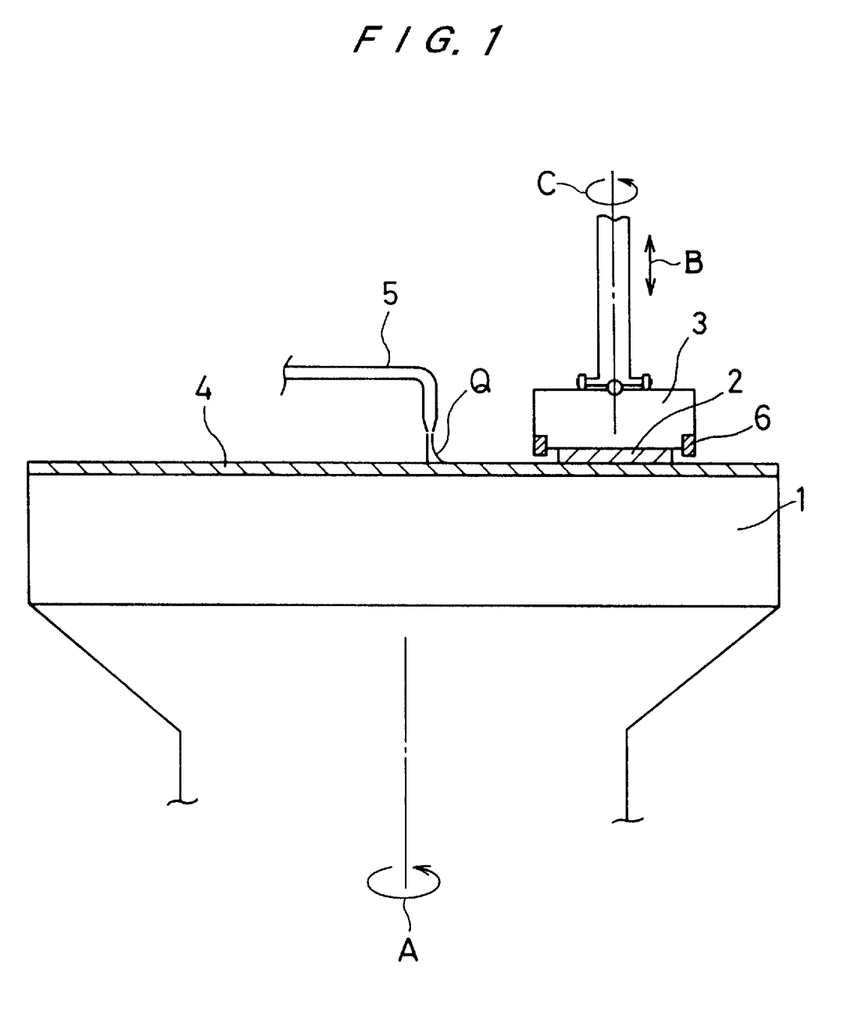
FIG. 1 is a vertical cross-sectional view of a polishing apparatus according to the present invention.

As shown in FIG. 1, a polishing apparatus according to the present invention comprises a turntable 1, and a top ring 3 positioned above the turntable 1 for holding a semiconductor wafer 2 against the turntable 1. The top ring 3 is located in an off-center position with respect to the turntable 1. The turntable 1 is rotatable about its own axis as indicated by the arrow A by a motor (not shown) which is coupled through a shaft to the turntable 1. A polishing cloth 4 is attached to an upper surface of the turntable 1.

The top ring 3 is coupled to a motor (not shown) and also to a lifting/lowering cylinder (not shown). The top ring 3 is vertically movable and rotatable about its own axis as indicated by the arrows B, C by the motor and the lifting/lowering cylinder. The top ring 3 can therefore press the semiconductor wafer 2 against the polishing cloth 4 under a desired pressure. The semiconductor wafer 2 is attached to a lower surface of the top ring 3 under a vacuum or the like. A guide ring 6 is mounted on the outer circumferential edge of the lower surface of the top ring 3 for preventing the semiconductor wafer 2 from being disengaged from the top ring 3.

An abrasive liquid supply nozzle 5 is disposed above the turntable 1 for supplying an abrasive liquid Q onto the polishing cloth 4 attached to the turntable 1.

The polishing apparatus operates as follows: The semiconductor wafer 2 is held on the lower surface of the top ring 3, and pressed against the polishing cloth 4 on the upper surface of the turntable 1. The turntable 1 and the top ring 3 are rotated relatively to each other for thereby bringing the lower surface of the semiconductor wafer 2 in sliding contact with the polishing cloth 4. At this time, the abrasive liquid nozzle 5 supplies the abrasive liquid Q to the polishing cloth 4, which retains the supplied abrasive liquid Q. The lower surface of the semiconductor wafer 2 is now polished by the abrasive liquid Q which is present between the lower surface of the semiconductor wafer 2 and the polishing cloth 4.

Figure 2:
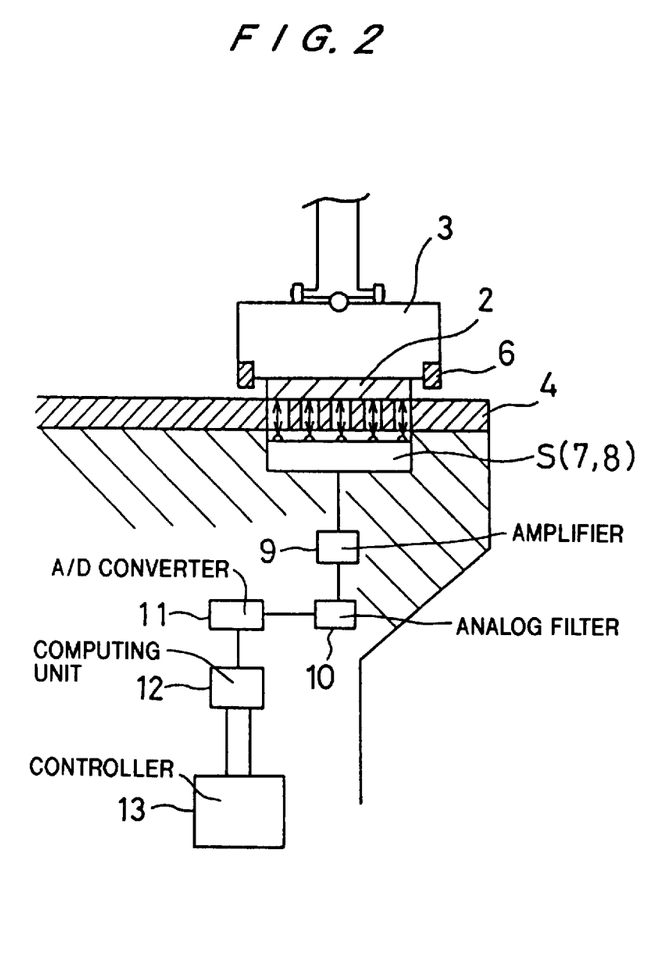
FIG. 2 a fragmentary vertical cross-sectional view of the polishing apparatus shown in FIG. 1.

FIG. 2 shows details of the polishing apparatus shown in FIG. 1. The semiconductor wafer 2 has a surface layer comprising an oxide layer ($SiO_2$) on its substrate, the surface layer being exposed on the lower surface thereof. The polishing apparatus has a thickness detector for detecting the thickness of the surface layer of the semiconductor wafer 2 while the semiconductor wafer 2 is being polished in the manner described above. The top ring 3 serves to keep the lower surface of the semiconductor wafer 2 covered by the polishing cloth 4 on the upper surface of the turntable 1 until a polishing process finished. While the lower surface of the semiconductor wafer 2 is being held in contact with the polishing cloth 4, the thickness detector continuously detects the thickness of the oxide layer of the semiconductor wafer 2 on a real-time basis while the semiconductor wafer 2 is being polished.

As shown in FIG. 2, the thickness detector has a sensor S comprising a plurality of light-emitting elements 7 for emitting light toward the lower surface of the semiconductor wafer 2 and a plurality of light-detecting elements 8 for detecting light reflected from the lower surface of the semiconductor wafer 2. The thickness detector also comprises an amplifier 9, an analog filter 10, an analog-to-digital (A/D) converter 11, a computing unit 12, and a controller 13. The polishing cloth 4 has holes defined therein for passing therethrough light emitted from the light-emitting elements 7 toward the semiconductor wafer 2 and light reflected from the semiconductor wafer 2 toward the light-detecting elements 8.

The sensor S is disposed in the turntable 1 below the polishing cloth 4 at a position within a path along which the top ring 3 moves on the turntable 1.

The thickness detector operates as follows: Light is emitted from the light-emitting elements 7 and impinges on the semiconductor wafer 2. Light that is reflected from the semiconductor wafer 2 and received by the light-detecting elements 8 is converted into respective analog electric signals proportional to the intensity of the light. The electric signals are then amplified by the amplifier 9 at a predetermined amplification factor, and the amplified electric signals pass through the analog filter 10 which removes unwanted noise from the electric signals. Then, the electric signals are supplied to the A/D converter 11 in which sampling is effected at certain intervals for conversion into respective digital signals.

The digital signals are supplied to the computing unit 12, which calculates the intensities of the respective digital signals, and adds the intensities to produce a sum value. The computing unit 12 calculates the thickness of the oxide layer of the semiconductor wafer 2 from the sum value. The computing unit 12 also compares the sum value with an initial value which has been stored, i.e., an initial value indicative of the intensities of light reflected from the semiconductor wafer 2 before it is polished, and calculates a polishing rate from the absolute value of the difference between the sum value and the initial value which are compared with each other. Based on the calculated thicknesses of the oxide layer and the calculated polishing rate over the entire polished surface of the semiconductor wafer, the computing unit 12 calculates operating conditions of the polishing apparatus. The computing unit 12 then delivers the calculated operating conditions to the controller 13, which controls the operating parameters of the polishing apparatus based on the delivered operating conditions for precisely controlling the thickness of the oxide layer to increase the flatness of the polished surface of the semiconductor wafer 2.

A flatness of the oxide layer of the semiconductor wafer 2 can be detected by detecting the thickness of the surface layer of the semiconductor wafer 2 at a plurality of spots and comparing the detected values with one another.

The polishing rate which will change with time during a polishing process can be found by detecting a change of the thickness of the surface layer of the semiconductor wafer at a specified spot with respect to an elapsed time when a polishing process is effected. A constant polishing rate can be obtained by controlling the operating parameters (such as pressure exerted by the top ring or rotational speeds of the turntable and the top ring) of the polishing apparatus on the basis of the obtained data. Further, a service life of the polishing cloth can be judged or estimated, and a dressing parameter for dressing the polishing cloth after the polishing process can be also determined. By detecting a change of the thickness of the surface layer of the semiconductor wafer at a plurality of spots radially spaced from one another with respect to an elapsed time when a polishing process is effected, the profile of the polished surface of the semiconductor wafer can be controlled during the polishing process using an adjusting mechanism for adjusting a pressure applied to an upper surface of the semiconductor wafer.

A polishing process of the polishing apparatus finished when the thickness of the surface layer of the workpiece detected by the thickness detector reaches a predetermined thickness. The polishing process of the polishing apparatus finished when the flatness of the surface of the surface layer of the workpiece detected by the thickness detector reaches a predetermined flatness.

Figure 3A:
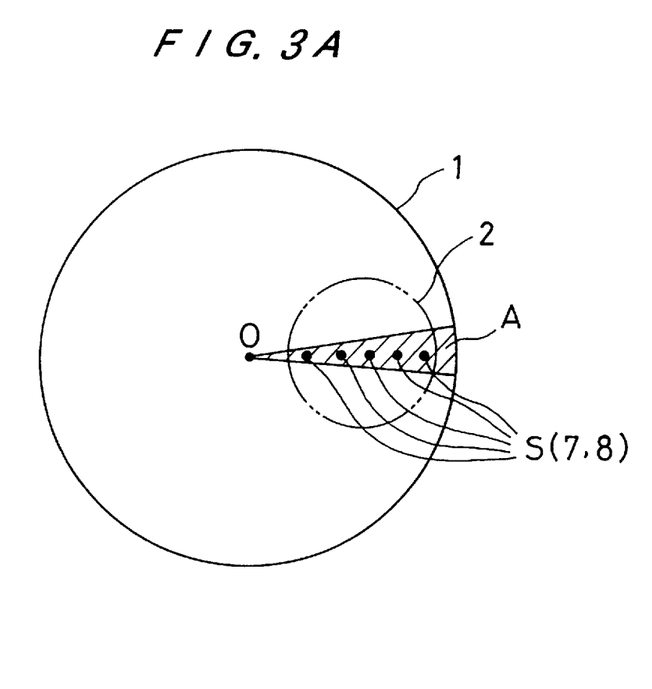
FIG. 3A is a plan view showing light-emitting elements and light-detecting elements incorporated in the polishing apparatus.
Figure 3B:
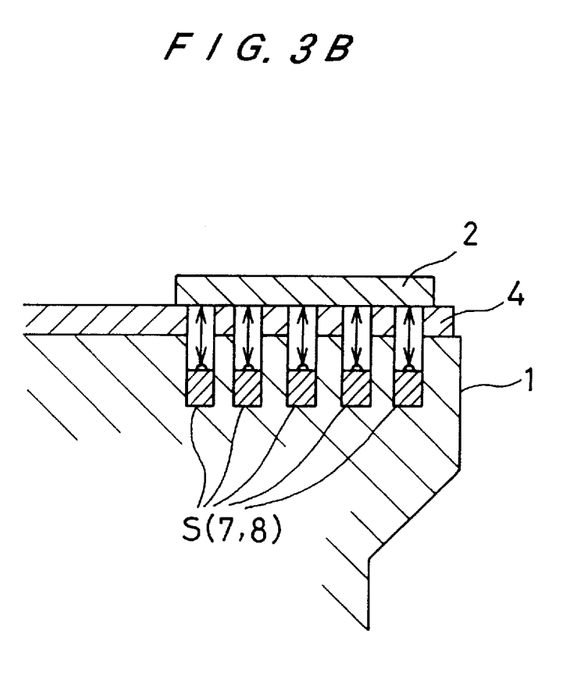
FIG. 3B is a fragmentary vertical cross-sectional view showing the light-emitting elements and the light-detecting elements shown in FIG. 3A.

As shown in FIGS. 3A and 3B, the light-emitting elements 7 and the light-detecting elements 8 are radially spaced at intervals at positions within the path of the top ring 3. The thickness detector shown in FIGS. 2, 3A and 3B is capable of detecting the thickness of the oxide layer at a plurality of points at one time.

Figure 4A:
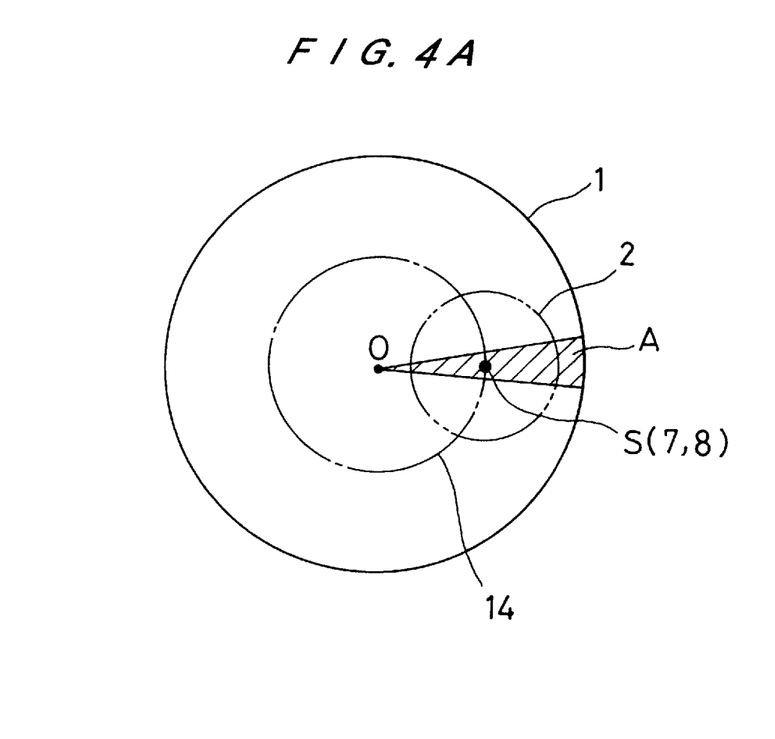
FIG. 4A is a plan view showing a light-emitting element and a light-detecting element incorporated in the polishing apparatus.
Figure 4B:
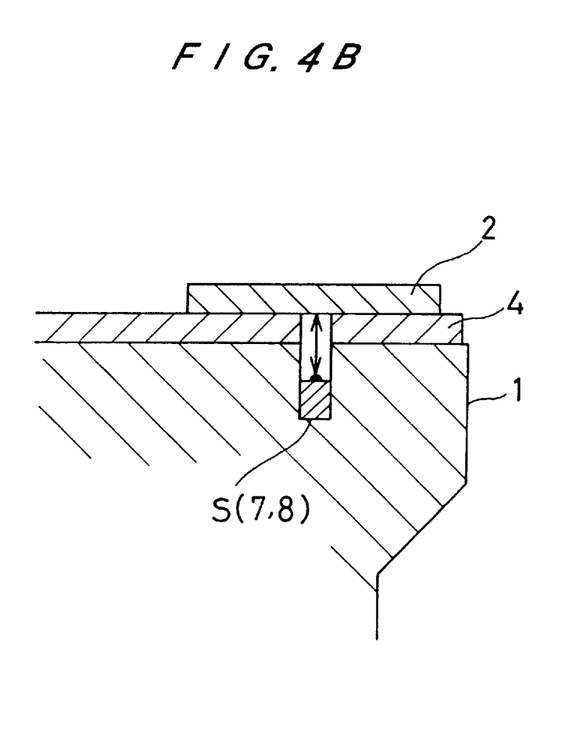
FIG. 4B is a fragmentary vertical cross-sectional view showing the light-emitting element and the light-detecting element shown in FIG. 4A.

FIGS. 4A and 4B show another thickness detector which may be used in the polishing apparatus. As shown in FIGS. 4A and 4B, the thickness detector has a sensor S comprising a single light-emitting element 7 for emitting light toward the lower surface of the semiconductor wafer 2 and a single light-detecting element 8 for detecting light reflected from the lower surface of the semiconductor wafer 2. The thickness detector also comprises the amplifier 9, the analog filter 10, the A/D converter 11, the computing unit 12, and the controller 13 as shown in FIG. 2. In operation, light is emitted from the light-emitting element 7 and impinges on the semiconductor wafer 2. Light that is reflected from the semiconductor wafer 2 and received by the light-detecting element 8 is converted into an analog electric signal proportional to the intensity of the light. The electric signal is then amplified by the amplifier 9 at a predetermined amplification factor, and the amplified electric signal passes through the analog filter 10 which removes unwanted noise from the electric signal. Then, the electric signal is supplied to the A/D converter 11 in which sampling is effected at certain intervals for conversion into a digital signal. The digital signal is supplied to the computing unit 12, which calculates the thickness of the oxide layer of the semiconductor wafer 2.

The thickness detector shown in FIGS. 4A and 4B is capable of detecting the thickness of the surface layer at different spots over its entire surface while the sensor S is moving relatively to the semiconductor wafer 2 within a given period of time. However, the thickness of the surface layer at the respective different spots over the entire polished surface of the semiconductor wafer is detected at different times. That is, there is a time lag in detection. If the thickness of the surface layer over its entire polished surface is to be detected at one time, then the thickness detector shown in FIGS. 3A and 3B should be employed.

In the embodiments shown in FIGS. 3A and 3B and FIGS. 4A and 4B, the sensor S is embedded in the turntable 1. Since there is no polishing cloth present directly above the sensor S on account of the holes defined in the polishing cloth 4 for the passage of light, the semiconductor wafer 2 might possibly suffer polishing irregularities due to the different abrasion capabilities of the polishing cloth 4. To avoid such a drawback, the polishing cloth 4 includes a sectorial region A (see FIGS. 3A and 4A) shown hatched which is defined by the center 0 of the turntable 1 and an arc subtending an angle at the center 0. The sectorial region A, in which the sensor S is positioned, comprises either a polishing cloth having a very low abrasion capability or a material having no abrasion capability such as a sealing tape or the like. Inasmuch as the sectorial region A extends fully radially, it causes no polishing irregularities on the polished surface of the semiconductor wafer 2.

A thickness of the surface layer comprising an oxide layer of the semiconductor wafer may be detected in the following manner as well.

Light emitted from the light-emitting element impinges on the oxide layer of the semiconductor wafer, and is reflected from a top surface and a bottom surface of the oxide layer. The reflected lights from the top and bottom surfaces interfere with each other to thereby generate a certain color. The thickness of the oxide layer can be detected by analyzing the above color with the light-detecting element.

As is apparent from the above description, according to the present invention, light emitted from the light-emitting element or elements impinges on the polished surface of the semiconductor wafer, and light reflected from the polished surface of the semiconductor wafer is received by the light-detecting element or elements. The thickness of the surface layer of the semiconductor wafer can automatically continuously be detected on a real-time basis based on the light detected by the light-detecting element or elements while the semiconductor wafer is being polished. Consequently, it is not necessary to remove the semiconductor wafer from the top ring or displace the top ring off the turntable for the purpose of detecting the thickness of the surface layer of the semiconductor wafer.

Although certain preferred embodiments of the present invention have been shown and described in detail, it should be understood that various changes and modifications may be made therein without departing from the scope of the appended claims.

What is claimed is:

1. A polishing apparatus comprising:

a turntable having thereon a polishing surface;

a top ring disposed above said turntable for supporting a workpiece to be polished and for pressing the workpiece against said polishing surface; and a thickness detector operable to, during relative movement between said top ring and said turntable, detect a thickness of a surface layer of the workpiece by performing a plurality of thickness detection operations over time and thereby to detect the thickness of the entire surface layer of the workpiece, each said thickness detection operation comprising detecting thickness of the surface layer at a plurality of spots spaced radially of said turntable at one time on a real-time basis, said thickness detector including a sensor mounted in said turntable at a position within a path of relative movement between said top ring and said turntable and operable to perform said plurality of thickness detection operations over time, said sensor comprising a plurality light-emitting elements operable to emit respective light beams toward the surface layer of the workpiece and a plurality of light-detecting elements operable to detect respective of the light beams reflected from the surface layer of the workpiece, said plurality of said light-emitting elements and said plurality of said light-detecting elements being spaced radially of said turntable, said light-detecting elements generating signals representative of detected thickness at said plurality of spots, and said signals being processed together to determine the thickness of the surface layer of the workpiece.

2. A polishing apparatus as claimed in claim 1, wherein said polishing surface comprises a polishing cloth having therein a hole for passing therethrough the light beams emitted from said light-emitting elements and the light beams reflected from the surface layer of the workpiece.

3. A polishing apparatus as claimed in claim 1, wherein said thickness detector is operable to detect the thickness of the surface layer of the workpiece based on a change in the intensity of the light beams reflected from the surface layer and detected by said light-detecting elements.

4. A polishing apparatus as claimed in claim 1, wherein said thickness detector is operable to detect flatness of the surface layer of the workpiece based on said plurality of thickness detection operations.

5. A polishing apparatus as claimed in claim 4, wherein said thickness detector is operable to end a polishing process of said polishing apparatus when the flatness of the surface layer of the workpiece detected by said thickness detector reaches a predetermined flatness.

6. A polishing apparatus as claimed in claim 1, wherein said thickness detector is operable to end a polishing process of said polishing apparatus when the thickness of the surface layer of the workpiece detected by said thickness detector reaches a predetermined thickness.

7. A polishing apparatus as claimed in claim 1, wherein said thickness detector is operable to calculate a polishing rate of the workpiece on the basis of the thickness of the surface layer of the workpiece detected by said thickness detector and an elapsed time during which a polishing process is effected.

8. A polishing apparatus as claimed in claim 1, wherein said polishing surface comprises a polishing cloth including a sectorial region extending radially and having one of a low abrasion capability and no abrasion capability, said sensor being positioned in said sectorial region.

9. A polishing apparatus as claimed in claim 1, wherein said thickness detector further comprises an amplifier for amplifying said signals generated by said light-detecting elements, an analog filter for removing noise from said signals amplified by said amplifier, an analog-to-digital converter for converting said signals into digital signals, and a computing unit for calculating an absolute value of a difference between said digital signals and an initial value and for comparing the thus calculated absolute value of said difference with a predetermined threshold value to produce resultant data.

10. A polishing apparatus as claimed in claim 9, wherein said thickness detector further comprises a controller for controlling operating parameters of said polishing apparatus based on said resultant data produced by said computing unit.

11. A polishing apparatus as claimed in claim 1, wherein said thickness detector is operable to control operating parameters of said polishing apparatus based on the detected thickness of the surface layer of the workpiece.

12. A polishing apparatus as claimed in claim 11, wherein said operating parameters include at least one of a pressure exerted on said top ring and rotational speeds of said turntable and said top ring.

13. A polishing apparatus as claimed in claim 11, wherein said operating parameters include a pressure applied to an upper surface of the workpiece.

14. A polishing apparatus as claimed in claim 11, further comprising means for rotating said turntable and said top ring about respective axes thereof to thereby provide said relative movement therebetween.

15. A polishing apparatus comprising:

a turntable having thereon a polishing surface;

a top ring disposed above said turntable for supporting a workpiece to be polished and for pressing the workpiece against said polishing surface; and a thickness detector operable to, during relative movement between said top ring and said turntable, detect a thickness of a surface layer of the workpiece by performing a plurality of thickness detection operations over time and thereby to detect the thickness of the entire surface layer of the workpiece, each said thickness detection operation comprising detecting thickness of the surface layer at a plurality of spots spaced radially of said turntable at one time on a real-time basis, said thickness detector comprising:

a sensor mounted in said turntable at a position within a path of relative movement between said top ring and said turntable and operable to perform said plurality of thickness detection operations over time, said sensor comprising a plurality light-emitting elements operable to emit respective light beams toward the surface layer of the workpiece and a plurality of light-detecting elements operable to detect respective of the light beams reflected from the surface layer of the workpiece, said plurality of said light-emitting elements and said plurality of said light-detecting elements being spaced radially of said turntable, and said light-detecting elements generating signals representative of detected thickness at said plurality of spots; and means for determining the thickness of the surface layer of the workpiece by processing together said signals from said light-detecting elements.

16. A polishing apparatus as claimed in claim 15, wherein said polishing surface comprises a polishing cloth having therein a hole for passing therethrough the light beams emitted from said light-emitting elements and the light beams reflected from the surface layer of the workpiece.

17. A polishing apparatus as claimed in claim 15, wherein said thickness detector is operable to detect the thickness of the surface layer of the workpiece based on a change in the intensity of the light beams reflected from the surface layer and detected by said light-detecting elements.

18. A polishing apparatus as claimed in claim 15, wherein said thickness detector is operable to detect flatness of the surface layer of the workpiece based on said plurality of thickness detection operations.

19. A polishing apparatus as claimed in claim 18, wherein said thickness detector is operable to end a polishing process of said polishing apparatus when the flatness of the surface layer of the workpiece detected by said thickness detector reaches a predetermined flatness.

20. A polishing apparatus as claimed in claim 15, wherein said thickness detector is operable to end a polishing process of said polishing apparatus when the thickness of the surface layer of the workpiece detected by said thickness detector reaches a predetermined thickness.

21. A polishing apparatus as claimed in claim 15, wherein said thickness detector is operable to calculate a polishing rate of the workpiece on the basis of the thickness of the surface layer of the workpiece detected by said thickness detector and an elapsed time during which a polishing process is effected.

22. A polishing apparatus as claimed in claim 15, wherein said polishing surface comprises a polishing cloth including a sectorial region extending radially and having one of a low abrasion capability and no abrasion capability, said sensor being positioned in said sectorial region.

23. A polishing apparatus as claimed in claim 15, wherein said means for determining comprises an amplifier for amplifying said signals generated by said light-detecting elements, an analog filter for removing noise from said signals amplified by said amplifier, an analog-to-digital converter for converting said signals into digital signals, and a computing unit for calculating an absolute value of a difference between said digital signals and an initial value and for comparing the thus calculated absolute value of said difference with a predetermined threshold value to produce resultant data.

24. A polishing apparatus as claimed in claim 23, wherein said thickness detector further comprises a controller for controlling operating parameters of said polishing apparatus based on said resultant data produced by said computing unit.

25. A polishing apparatus as claimed in claim 15, wherein said thickness detector is operable to control operating parameters of said polishing apparatus based on the determined thickness of the surface layer of the workpiece.

26. A polishing apparatus as claimed in claim 25, wherein said operating parameters include at least one of a pressure exerted on said top ring and rotational speeds of said turntable and said top ring.

27. A polishing apparatus as claimed in claim 25, wherein said operating parameters include a pressure applied to an upper surface of the workpiece.

28. A polishing apparatus as claimed in claim 15, further comprising means for rotating said turntable and said top ring about respective axes thereof to thereby provide said relative movement therebetween.

29. A polishing apparatus comprising:

a turntable having thereon a polishing surface;

a top ring disposed above said turntable for supporting a workpiece to be polished and for pressing the workpiece against said polishing surface; and a thickness detector operable to, during relative movement between said top ring and said turntable, detect a flatness of a surface layer of the workpiece by performing a plurality of thickness detection operations over time and thereby to detect the flatness of the entire surface layer of the workpiece, each said thickness detection operation comprising detecting thickness of the surface layer at a plurality of spots spaced radially of said turntable at one time on a real-time basis, said thickness detector comprising:

a sensor mounted in said turntable at a position within a path of relative movement between said top ring and said turntable and operable to perform said plurality of thickness detection operations over time, said sensor comprising a plurality light-emitting elements operable to emit respective light beams toward the surface layer of the workpiece and a plurality of light-detecting elements operable to detect respective of the light beams reflected from the surface layer of the workpiece, said plurality of said light-emitting elements and said plurality of said light-detecting elements being spaced radially of said turntable, and said light-detecting elements generating signals representative of detected thickness at said plurality of spots; and means for determining the flatness of the surface layer of the workpiece by processing together said signals from said light-detecting elements.

30. A polishing apparatus as claimed in claim 29, wherein said polishing surface comprises a polishing cloth having therein a hole for passing therethrough the light beams emitted from said light-emitting elements and the light beams reflected from the surface layer of the workpiece.

31. A polishing apparatus as claimed in claim 29, wherein said thickness detector is operable to detect the flatness of the surface layer of the workpiece based on a change in the intensity of the light beams reflected from the surface layer and detected by said light-detecting elements.

32. A polishing apparatus as claimed in claim 29, wherein said thickness detector is operable to end a polishing process of said polishing apparatus when the flatness of the surface layer of the workpiece detected by said thickness detector reaches a predetermined flatness.

33. A polishing apparatus as claimed in claim 29, wherein said polishing surface comprises a polishing cloth including a sectorial region extending radially and having one of a low abrasion capability and no abrasion capability, said sensor being positioned in said sectorial region.

34. A polishing apparatus as claimed in claim 29, wherein said means for determining comprises an amplifier for amplifying said signals generated by said light-detecting elements, an analog filter for removing noise from said signals amplified by said amplifier, an analog-to-digital converter for converting said signals into digital signals, and a computing unit for calculating an absolute value of a difference between said digital signals and an initial value and for comparing the thus calculated absolute value of said difference with a predetermined threshold value to produce resultant data.

35. A polishing apparatus as claimed in claim 34, wherein said thickness detector further comprises a controller for controlling operating parameters of said polishing apparatus based on said resultant data produced by said computing unit.

36. A polishing apparatus as claimed in claim 29, wherein said thickness detector is operable to control operating parameters of said polishing apparatus based on the determined flatness of the surface layer of the workpiece.

37. A polishing apparatus as claimed in claim 36, wherein said operating parameters include at least one of a pressure exerted on said top ring and rotational speeds of said turntable and said top ring.

38. A polishing apparatus as claimed in claim 36, wherein said operating parameters include a pressure applied to an upper surface of the workpiece.

39. A polishing apparatus as claimed in claim 29, further comprising means for rotating said turntable and said top ring about respective axes thereof to thereby provide said relative movement therebetween.

* * * * *

UNITED STATES PATENT AND TRADEMARK OFFICE
CERTIFICATE OF CORRECTION

PATENT NO. : 5,838,447
DATED : November 17, 1998
INVENTOR(S) : Hirokuni HIYAMA et al.

It is certified that error appears in the above-indentified patent and that said Letters Patent is hereby corrected as shown below:

Column 8, line 39, change "claim 11" to --claim 1--.

Signed and Sealed this

First Day of June, 1999

Attest:

Attesting Officer

Q. TODD DICKINSON

Acting Commissioner of Patents and Trademarks